March 12, 1968      H. SCHREINER      3,373,003
MULTI-LAYER BONDED METAL STRUCTURE
Filed March 28, 1966
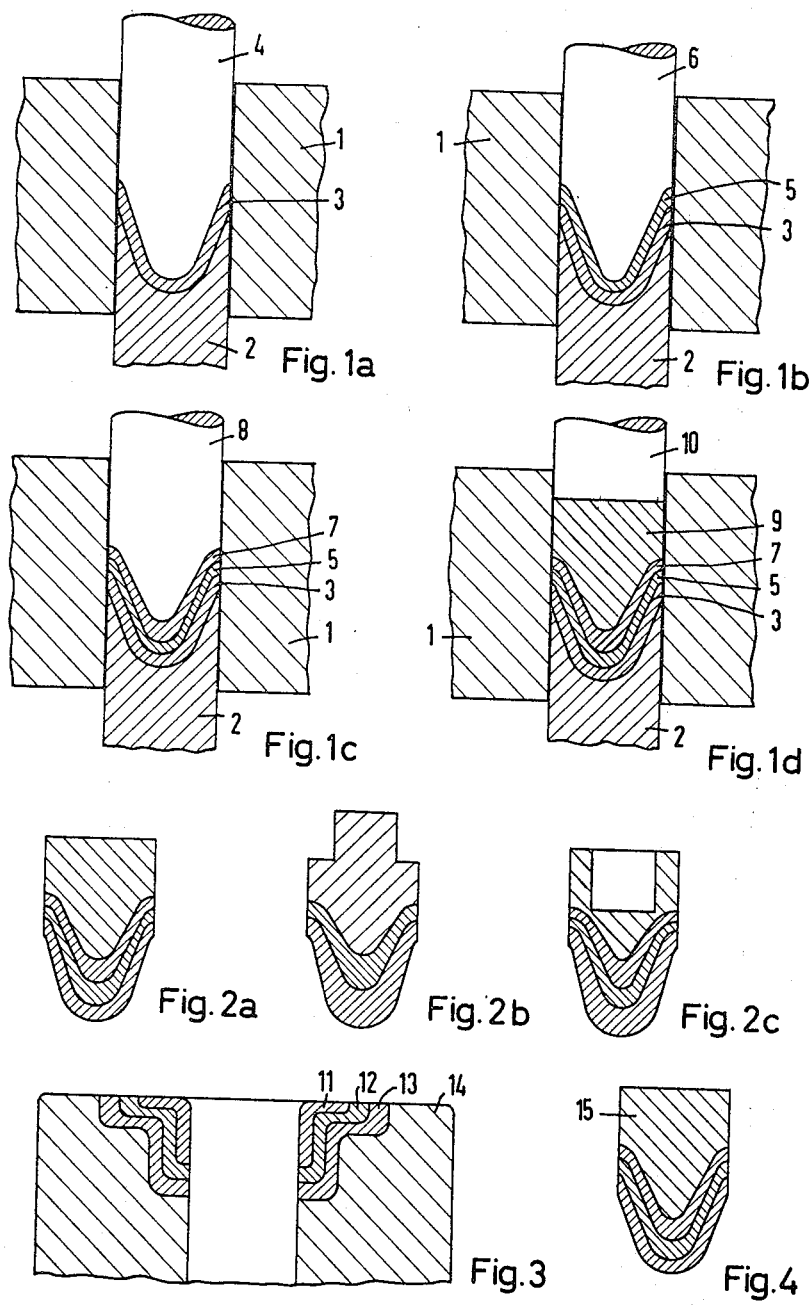

United States Patent Office 3,373,003
Patented Mar. 12, 1968

3,373,003
MULTI-LAYER BONDED METAL STRUCTURE
Horst Schreiner, Nurnberg, Germany, assignor to Siemens Aktiengesellschaft, a corporation of Germany
Filed Mar. 28, 1966, Ser. No. 537,896
Claims priority, application Germany, Apr. 1, 1965, S 96,322
1 Claim. (Cl. 29—182.2)

ABSTRACT OF THE DISCLOSURE

Disclosed is an improved multi-layer bonded metal structure suitable for use in high voltage and heavy duty electrical contacts. The multi-layer bonded metal structure consists essentially of a sintered plurality of substantially parallel compressed metal powder layers. These layers respectively consist of a first metal composition which is impregnated with a second metal. The abutting surfaces of the respective layers interpregnate into one another. The metal layers are selected from the group consisting of tungsten, molybdenum and rhenium and the impregnating metal is selected from the group consisting of copper, silver, copper alloys, silver alloys, nickel, iron, cobalt and chromium.

---

My invention relates to multi-layer metals. More particularly, it relates to an improved multi-layer bonded metal structure suitable for use in high voltage and heavy duty electrical contacts.

High voltage and heavy duty electrical contacts require a high burn-off resistance to switching arcs at at least one layer of the contact surface. In addition, there is required therein assurance against the scaling of the contact operating material from its carrier metal base. Of course, high voltage special contacts should lend themselves to economical production techniques.

It is accordingly an important object of this invention to provide an improved multi-layer bonded metal particularly suited for use in heavy duty and high voltage electrical contacts such as, for example, switching pins, switching cups for laminated brush contacts and the like which fulfill the above-mentioned requirements, i.e. capability of being employed for heavier duty and higher voltage switching, minimization of scaling from an underlying base carrier metal, and improved life span.

It is another object to provide a method for providing the multi-layer bonded metal in accordance with the preceding object.

These objects are achieved, according to the invention, by providing a multi-layer bonded metal comprising a plurality of metal powder layers, each of the layers running substantially parallel to the operating surface of the contact. These metal layers continuously interblend with their adjacent metal layers and are formed by pressing, sintering and impregnating and may respectively be of the same or of different compositions.

Bonded metal structures of the mutually interpenetrating type, as such, are known. They are characterized by the fact that all of the structural members of the components thereof, for example, are connected to each other such that, effectively, the structures of the respective components are as if inserted into one another.

In the forming of the interpenetrating type multi-layer bonded metal structure of continuously interblended layers according to the invention, there is utilized the known fact that it is possible to provide a sinter skeleton with high structural stability and minimal sinter shrinkage through a proper selection of the powder mixture combination to be compressed and the pressing and sintering conditions, such resulting sinter skeleton also being characterized by good wettability. Such selection can be made whereby there results an impregnated metal such as, for example, silver, copper, or a silver or copper alloy in the immersing dipping or application impregnating process as a structural element, the impregnated metal penetrating into the pores of the sinter structure, progressively increasing in its concentration in the pressing direction corresponding to the concentration of the sintered structure. This structural result causes a continuing change in characteristics. For example, in the case of a tungsten contact, the continuing characteristics change is such that the contact layer side has a higher content of tungsten and correspondingly, therefore, has a greater hardness or toughness and a higher burn-off resistance. By contrast, the side of the contact material structure which is hard soldered or welded to the carrier metal has the larger content of impregnated material and thereby has, for example, the greatest heat conductance and soldering capacity, whereby, between the two surface layers, there occurs a gradual transition of characteristics.

With such technique, in addition to its enabling the production of interpenetrating bonded metals comprising tungsten as their principal component, there can also be produced the systems $M_1$–$M_2$ and $M_1$–$M_2$–$M_3$. For metal $M_1$, there can be used in addition to tungsten, metals such as molybdenum and rhenium. For metal $M_2$, there can be used such metals as copper, silver or their alloys respectively and for metal $M_3$, such metals as nickel, iron, cobalt and chromium are advantageously suitable.

Interpenetrating multi-layer bonded metals with continuously blended layers present the advantage over known multi-layer bonded metals of being producible by simpler and more economical methods. This is because in the production of the interpenetrating multi-layer bonded metals, since, the pressing and after-pressing forces need not be as great as in the production of the known bonded metals. In addition, the necessary differences in constituent concentrations in the metal body structure may initially be effected with a powder mixture already having such different concentrations in a single layer or a multi-layer compression. The continuously changing constituent concentration of the structural elements within the metal body structure produces a good bonding of the individual layers during electrical, mechanical and/or thermal stress. The parallel layers even further increase available interdigitating surfaces between the individual contact layers and, thereby, also further increase the bonding.

In an embodiment of a method according to the invention for producing contacts as described hereinabove, a plurality of metal powder layers, which may each have the same composition, are compressed by varying pressing forces such that the outermost layer is compressed with the highest pressing force and the innermost layer is compressed with the lowest pressing force. If a larger concentration gradient and, therefore, a greater variation in the characteristics over a given thickness is required for the continuously interblending parallel layers, it is particularly advantageous to compress the layers into a single compressed body by means of multi-layer pressing of metal powders of respective different compositions in which the pressing effect for each additional layer following the outermost layer is either the same or less than the one for the outermost layer.

In accordance with a further feature of the invention, the compressed surfaces are loosened prior to the application of the next powder layer to be pressed thereon. Such loosening may be effected by a wire brush or like device and, in addition to its enabling the achievement of a good mechanical interdigitation between the individual layers, also results in the production of the continuous interblending functions between the respective metal powder layers.

Generally speaking and in accordance with the invention, there is provided a multi-layer bonded metal structure comprising a sintered plurality of substantially parallel compressed metal powder layers, the layers respectively comprising first metal compositions, the sintered structure being impregnated with at least a second metal, the abutting surfaces of the respective layers interpenetrating into one another.

Also in accordance with the invention there is provided a method of producing a multi-layer bonded metal structure comprising the steps of successively subjecting a plurality of metal powder layers to a compression upon each other to form a body comprising substantially parallel metal layers, sintering the layered body, and impregnating the sintered body to form the structure.

The foregoing and more specific objects and features of my invention will be apparent from, and will be mentioned in the following description of a multi-layer bonded metal structure according to the invention shown by way of example in the accompanying drawing.

In the drawing, FIGS. 1a to 1d are sectional views of the various steps which obtain in the forming of a multi-layer bonded metal structure in accordance with the principles of the invention.

FIGS. 2a to 2c are sectional views of examples of structures of various end layer configurations made according to the invention;

FIG. 3 is a sectional view of a high voltage, heavy duty electrical contact, made in accordance with the invention; and FIG. 4 is a sectional view of a switch contact pin made according to the invention.

As has been set forth hereinabove, the multi-layer bonded metal structure according to the invention and particularly suitable as a high voltage and heavy duty electrical contact comprises an interpenetrating-bonded metal composition in which the layers run substantially parallel to the surface, are of diverse compositions and merge into each other without any concentration jump. The interpenetrating-type bonded metal is produced through the multi-layer compressing of a metal powder, through the sintering of the pressed body and through the impregnating of the sintered body. The substantially parallel layers are suitably produced by a multi-layer filling in of metal powder into a die and by pressing the individual layers upon each other.

Such production is illustrated in FIGS. 1a–1d. In considering these figures, it is to be understood, that the multi-layer structures resulting from powder layer compressions are sintered to impart a high degree of stability of the structures. Sinter shrinkage is so adjusted that it lies between approximately 0.5 and 5%. The resulting porous sintered structure is saturated in a known manner with a metal such as, for example, copper, silver or a copper or silver alloy. In situations where wetting of the sintered structure with a metal element is found to be inadequate for the sintered structure, and where the saturation is incomplete, the wetting can be improved by alloy supplements such as, for example, the addition of one percent silver to copper to reduce the surface tension of the wetting metal.

Saturation may be made to take place by immersing sintered portions in the melt of the saturating metal, i.e., dip saturation. It has been found to be advantageous to saturate an individual sintered structural body with the saturating metal mass within a graphite form, for example, to effect the required filling of all of the pores of the sintered structure with the saturating metal. Alternatively, the sintered structure may be saturated with the saturating metal mass and then "backed up" therewith, such steps being carried out with the use of the graphite form. By "back-up" is meant a back-up casting or pouring.

Referring now to FIGS. 1a–1d wherein there is shown, by way of example, a switching pin made according to the invention, a metal powder 3 which may be a powder mixture of reduced tungsten powder having a particle size of about or less than 200 μm., electrolytic copper powder having a particle size of about or less than 60 μm., and carbonyl-nickel powder having a particle size of about or less than 10 μm. in a combination of about 97.8 percent by weight of tungsten, about 2 percent by weight of copper and about 0.2 percent by weight of nickel is introduced into the interior of a die 1, the interior of die 1 suitably being of cylindrical configuration, and compressed with an upper plunger or pressing stamp 4 at a pressure of about 2 tons/cm.$^2$. FIG. 1a shows the situation which obtains in die 1 at the compression of powder layer 3.

After the pressure by plunger 4 has been applied, a second powder layer 5 is introduced on compressed layer 3. This second layer 5 may, for example, be a composition of the powders present in layer 3 in a composition of about 88 percent by weight of tungsten, 10 percent by weight of copper and 2 percent by weight of nickel, the introduction of powder layer 5 on compressed layer 3 causing the surface of layer 3 to be roughened and loosened. Powder layer 5 is also compressed at a pressure of about 2 tons/cm.$^2$, such compression step being shown in FIG. 1b. In the same manner, the introduction and compression of further powder layers may be carried out with powder mixtures having a lesser proportion of tungsten to copper and nickel as compared to the previously set forth powder mixtures for layers 3 and 5 respectively. FIG. 1c accordingly shows a third such powder layer 7 which has been compressed, suitably at the aforesaid 2 tons/cm.$^2$ pressure by a plunger 8. The final layer, i.e., layer 9 shown in FIG. 1d, may suitably comprise a powder mixture of 70 percent by weight of tungsten, 28 percent by weight of copper, and 2 percent by weight of nickel and may be compressed with a plunger 10 which may have a flat pressing surface or a profiled surface, the compression also being suitably carried out at a 2 tons/cm.$^2$ pressure. FIGS. 2a to 2c are depictions of final compressed structures resulting from the process as depicted in FIGS. 1a to 1d. It is of course to be noted that the compressions are carried out against a lower plunger 2 contained within the interior of die 1.

The multi-layer compressed structures are then suitably sintered at a temperature of about 1250° C. for about an hour in an appropriate atmosphere such as hydrogen, ammonia, nitrogen-hydrogen in a ratio of four to one parts by volume respectively, or a vacuum, i.e., approximately $10^{-3}$ torr.

The thus obtained sintered structures are inserted into an approximately dimensioned cavity of a graphite form together with a proper amount of copper from electrolytic copper, for example, such proper amount being that required for saturation of the compressed structure, the copper being provided as a cylindrical body or a metal-powder compressed body. The graphite form suitably has several openings extending thereinto, i.e. pores, and in the saturating step, the graphite form containing the compressed sintered structure and the copper is passed through a protective gas or vacuum furnace at a temperature of about 1250° C. with the components within the form being kept at the latter temperature for about 15 minutes. The final saturated structure is attained by the making of a separation at the portion which was backed up, i.e., back-up cast, with excess copper.

In FIG. 3, there is shown a multi-layer bonded metal structure produced according to the invention and suitable for use as a high voltage, heavy duty, electrical contact. The burn-off ring of this contact comprises four layers 11, 12, 13 and 14 which are substantially parallel to the burn-off surface. The metal powder compositions employed respectively for each of layers 11 to 14 may be the same and the compression force may be respectively less in the forming of each layer. Alternatively, differing powder compositions may be respectively employed to form each of the letters in which case, each of the layers may or may not be formed with the same compression force as is required. Materials characterized by good burn-off stability and consequently suitable for use as electrical contacts are W-Cu, W-Ag, Mo-Cu, Mo-Ag, W-Mo-Cu, W-Mo-Ag, Re-Cu, and Re-Ag. The selection of the composition for the top contact layer is suitably chosen for the use that is intended. Thus, for example, the maximum burn-off stability which may be required of a top layer contact material under relatively light duty conditions can suitably be a layer comprising 50–80% by weight of tungsten molybdenum or rhenium. In such example, the layers immediately following each other below such top layer have progressively reduced tungsten-molybdenum or rhenium-content, i.e., the lowest layer, i.e., layer 13 has the lowest content of tungsten, molybdenum and rhenium.

As is shown in FIG. 4, the multi-layer bonded metal contact may also be undercast during its impregnation with a metal such as copper or silver. Advantageously, impregnation is carried out within a graphite or a ceramic form, the impregnating metal being applied to one surface of the pressed structure.

It is to be noted in FIGS. 1a–1d that in layers 5, 7, 9, thereof which follow layer 3, the abutting areas thereof are configured in an increasingly flattening sense, i.e., a mutual hugging, as it were, of the respective layers, and a rounding off at the corners of the layers. To effect such configuration, a plurality of pressing stamps, viz. stamps 4, 6 and 8 are employed which respectively determine the surface configuration of the individual compressed layers, the stamps effecting the compressions of the individual layers in conjunction with the single lower plunger 2. Such configuring of the respective layers may further improve the bondings at their edges and/or in the intermediate regions. In addition, differential characteristic changes in the respective layers can be obtained through such configuring method rather than by means of a mere paralleling of the layers.

It will be obvious to those skilled in the art upon studying this disclosure that multi-layer bonded metal structures according to my invention permit of a great variety of modifications and hence can be given embodiments other than those particularly illustrated and described herein without departing from the essential features of my invention and within the scope of the claim annexed hereto.

I claim:

1. A multi-layer bonded metal structure consisting essentially of a sintered plurality of substantially parallel compressed metal powder layers, said layers respectively consisting essentially of a first metal composition, said sintered structure being impregnated with at least a second metal, the abutting surfaces of the respective layers interpregnating into one another, said first metal composition being selected from the group consisting of tungsten, molybdenum and rhenium metal powders and said impregnating metal being selected from the group consisting of copper, silver, copper alloys, silver alloys, nickel, iron, cobalt and chromium; each of said layers is formed from a like metal composition with densities progressively decreasing from outer to inner layers and the respective end portions of the layers above an end layer are progressively increasingly flatter.

References Cited

UNITED STATES PATENTS

| 2,401,483 | 6/1946 | Hensel | 29—182.1 X |
| 2,439,570 | 4/1948 | Hensel | 29—182.1 X |
| 2,706,759 | 4/1955 | Williamson | 29—182.1 X |
| 2,753,859 | 7/1956 | Bartlett | 29—182.1 |
| 3,037,860 | 6/1962 | Masterson | 75—208 |
| 3,107,418 | 10/1963 | Gorman | 29—182.1 X |

FOREIGN PATENTS 658,335  10/1951  Great Britain.

CARL D. QUARFORTH, *Primary Examiner.*

BENJAMIN R. PADGETT, *Examiner.*

A. J. STEINER, *Assistant Examiner.*